Feb. 17, 1970  C. LOMBARD  3,495,469
ELECTRIC CONTROL SYSTEMS FOR AUTOMATIC TRANSMISSIONS
Filed Jan. 29, 1968  2 Sheets-Sheet 1

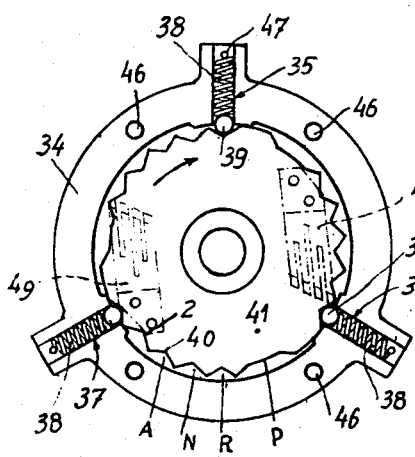
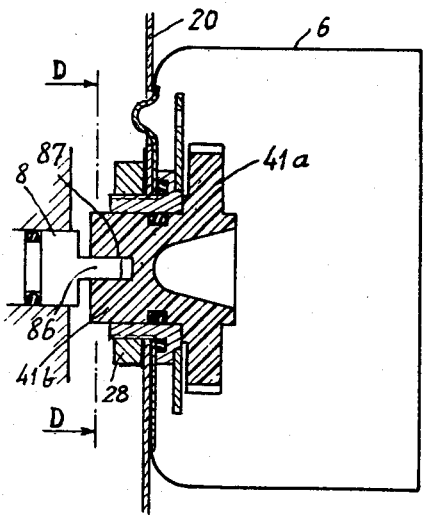
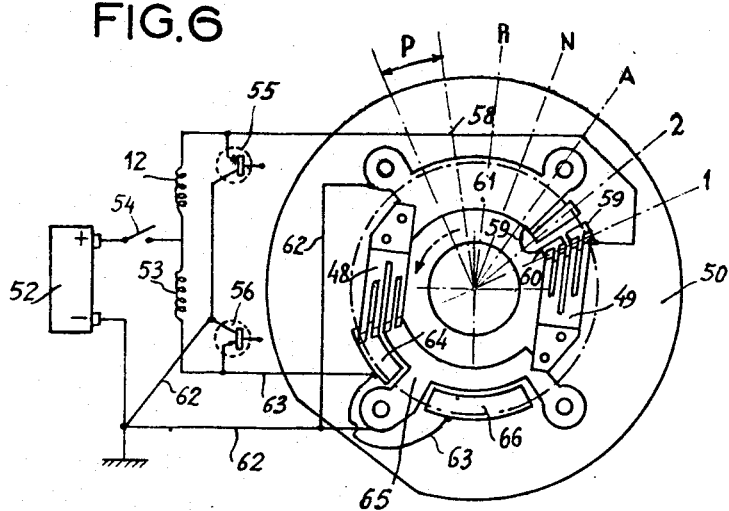
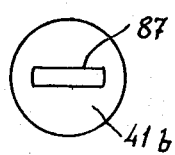
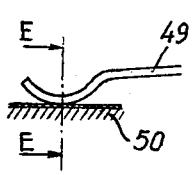
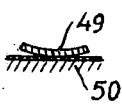

United States Patent Office
3,495,469
Patented Feb. 17, 1970

1

3,495,469
ELECTRIC CONTROL SYSTEMS FOR AUTOMATIC TRANSMISSIONS
Claude Lombard, Billancourt, France, assignor to Regie Nationale des Usines Renault, Billancourt, Hauts-de-Seine, France and Automobiles Peugeot, Paris, France
Filed Jan. 29, 1968, Ser. No. 701,223
Claims priority, application France, Feb. 8, 1967, 94,071
Int. Cl. F16h 5/50
U.S. Cl. 74—336.5     11 Claims

ABSTRACT OF THE DISCLOSURE

An electronic device for controlling automatic transmissions of vehicles or machines, characterised in that the electronic devices of known type which receive information from a governor and convert it into change-speed orders are enclosed in a common case with a switch associated with the gear lever of the vehicle, said switch permitting modifying the laws of automatic operation of the transmission at the driver's will.

---

The present invention relates to electric control systems for electronically controlling automatic change-speed transmissions of automotive vehicles or machines, and has specific reference to an assembly of mechanical units constituting a coherent system whereby on the one hand the electronic devices ensuring the automatic gear changes proper and on the other hand a switch associated with the gear lever of the vehicle or machine can be enclosed in a single case of relatively small dimensions, said switch enabling the driver to control the system at will and as required by driving conditions and circumstances.

The control case is mounted on the transmission mechanism and made fluid-tight by relatively simple means. Moreover, the possibility of heat transfer from the transmission mechanism to this case is extremely reduced, thus protecting the electronic devices from high temperatures likely to impair their useful life. However, the mechanical operative connection therebetween is sufficient to enable the detent-positioned switch to control the desired positions of the mechanical control members within the automatic gearbox, change-speed gear or transmission.

In order to afford a clearer understanding of this invention and of the manner in which the same may be carried out in practice, reference will now be made to the accompanying drawings illustrating diagrammatically by way of example a typical form of embodiment, with a few modifications, of the electric control system constituting the subject-matter of this invention. In the drawings:

FIGURE 5 is a section taken along the plane B—B of FIGURE 4, showing the detent-positioning device of the switch associated with the gear lever;

FIGURE 6 is a front view in the direction of the arrows C—C, FIGURE 4, illustrating diagrammatically the printed circuit and the contact brushes;

FIGURE 7 is a modified form of embodiment of the

2 drive of the detent-positioning device of the gear-lever switch, which form a single integral member;

FIGURE 8 is a section taken along the plane D—D of FIGURE 7, to illustrate the configuration of the female member of the screwdriver or tenon-and-slot coupling or drive, and FIGURES 9 and 10 illustrate details of the operative end of each switch contact brushes.

Figure 1:
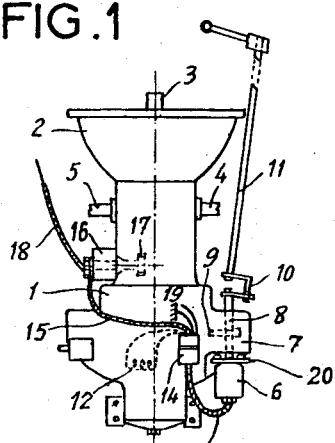
FIGURE 1 is a plane view from above showing an automatic transmission incorporating the final drive, and the position of the control case of this invention thereon.
Figure 2:
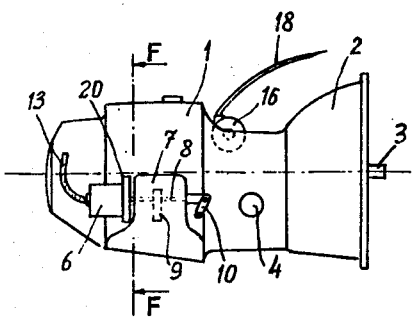
FIGURE 2 is a side-elevational view of the same transmission.

Referring first to FIGURES 1 and 2 of the drawing, it will be seen that the automatic transmission or gearbox 1 is coupled through a hydraulic torque converter enclosed in a bell-shaped case 2 to the engine output shaft coupled for this purpose to the converter shaft 3. The output shafts of the final drive are shown at 4 and 5, and lead to the driving road wheels (not shown). The electronic control case 6 according to this invention is secured to a pbrojecting portion or boss 7 of the gear case by means of a pressed plate 20. A control shaft 8 driven through a joint 10 from the gear lever 11 extends through said projection or boss 7. The gear lever is adapted as in conventional automatic transmission control systems to display the driver's will of obtaining the various positions such as neutral, forward drive, parking, etc. Thus, the control shaft 8 is connected within the boss 7 to an arm 9 for carrying out in the known manner the driver's orders within the transmission mechanism.

The electronic control case 6 receives through multiple conductors 13 and 15, and a connecting box 14 the orders issuing from a governor or distributor 16 receiving the vehicle speed information from a pinion 17 and the vehicle accelerator position information via a cable 18. This governor is of any known and suitable type and may be adapted ntably to deliver a voltage increasing with the vehicle speed and decreasing as the accelerator pedal is depressed. Under these circumstances the electronic control case 6 of this invention would be of the voltage-responsive type and the electronic elements or devices thereof would consist notably of the combination described in the U.S. Patent 3,403,747 to de Castelet filed May 6, 1966 and issued Oct. 1, 1968.

In an alternate form of embodiment (not shown) the connecting box 14 may be secured to the aforesaid flange 20 and notably extend therethrough, conductors 13 and 15 being disposed in this case on either side of flange 20, the latter being widened accordingly to permit the passage of connecting box 14.

The electronic control case 6 delivers to electric members 12 disposed therein the orders converted or elaborated from the information received from governor 16 and gear lever 11, by using to this end the current produced by the generator of the vehicle and fed via conductors 19.

Figure 4:
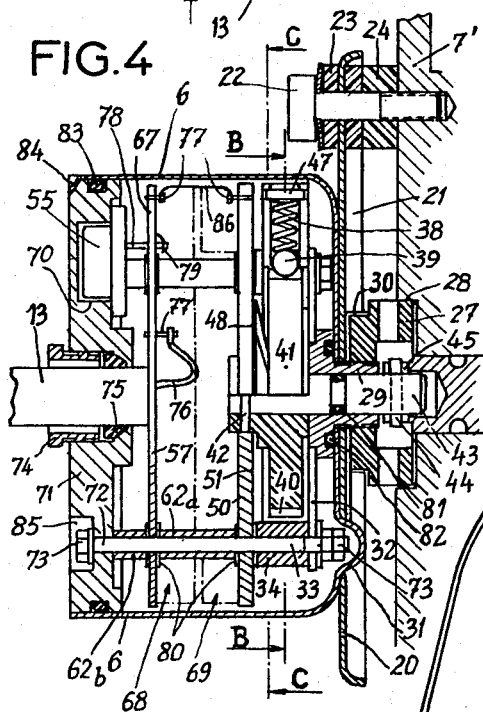
FIGURE 4 is a section taken along the broken line A—A of FIGURE 3, showing constructional details of the control case.
Figure 3:
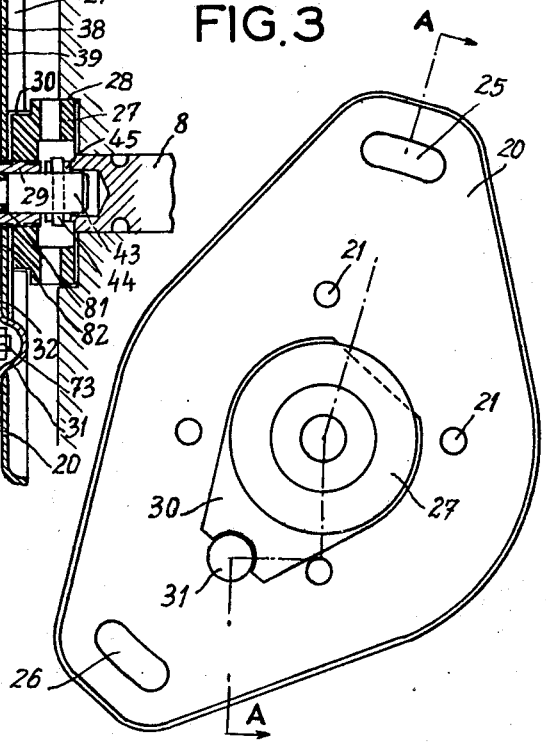
FIGURE 3 is a front view showing on a larger scale the case mounting plate, as seen in the direction of the arrows F—F of FIGURE 2.

FIGURE 4, which is a section taken along the broken line A—A of FIGURE 3 across the electronic control case, shows the case mounting, the switch driving means and the internal arrangement. The case 6 is secured to the pressed plate 20 by four arc-welding spots 21 shown in FIGURE 3. The plate 20 is secured in turn in a machined cavity 7' of boss 7 by means of bolts 22 of which only one is illustrated, this bolt clamping not only the plate 20 but also plastic insulating washers 23 and 24. These bolts 22 extend through elongated holes 25 and 26 formed in said plate 20 and having a width slightly greater than the bolt diameter. The complete case 6 is centered by the circular plastic nut 27 in the bore 28 of said cavity 7'. This nut 27 is screwed on the shouldered and screw-threaded ring 29 and locked by a sheet-metal lock washer 30 engaging the pressed projection 31 of plate 20. Soldered on said shouldered ring 29 is a plate 32 constituting the base of the switch detent-positioning device. To this end the plate 32 is traversed by four rods of which one 33 is somewhat longer and projects into the cavity of the aforesaid pressed projection 31 of plate 20.

Contacting the plate 32 is a moulded plastic member 34 shown in detail in the section of FIGURE 5; this member 34 comprises three radial holes 35, 36 and 37, spaced 120 degres apart and containing each a coil compression spring 38 urging a ball 39 into the peripheral notches 40 formed in another plastic member 41 constituting the rotor of the detent-positioning device, this member 41 being fastened by a diametral pin 42 to the shaft 43 of the electronic case 6. This shaft 43 is guided by the bore formed in the shouldered ring 29 and is rotatably connected to the transmission control shaft 8 by means of another diametral pin 44 engaging a slot 45 formed in said shaft 8.

The plastic member 34 has four axial holes 46 formed therethrough for receiving the aforesaid rods such as 33 and holding said member against rotation. Thus, a six-position dentent-positioning device is obtained, one position being relatively broad and without any definite purpose. This dentent-positioning device controls the position of the control shaft 8 and the positions of corresponding mechanical members in the transmission, such as slide valves, etc. for the five remaining positions.

The springs 38 are retained at their outer ends by pins 47.

The rotor 41 carries two contact brushes 48 and 49 for example of beryllium bronze, each in the form of a comb having four teeth of unequal lengths, in order to avoid a single resonance frequency therein. The ends of these teeth are rounded and adapted resiliently to engage the plate 50 of the printed circuit of which the copper face is denoted by the reference numeral 51.

The copper portions of plate 50 are shown in the diagram of FIGURE 6 together with the two contact brushes and the electric circuit. The vehicle battery 52 has its positive terminal connected through the key switch 54 of the vehicle to the windings of the control electromagnets 12 and 53. The electromagnet 53 controls the second or intermediate gear of a three-speed transmission, and the first or low gear is obtained by simultaneously energizing both electromagnets 12 and 53.

The electromagnet 12 may also be grounded through a semi-conductor 55 of the electronic system and conductor 62, or, if the switch is in the position illustrated in FIGURE 6, through conductor 58, contact stud 59, the two external teeth, then the two internal teeth, of contact brush 49, contact stud 60, conductor 59, strip 61 and conductors 62 consisting in fact of the distance pieces 62a and 62b shown in FIGURE 4.

Under the same conditions, electromagnet 53 may be grounded through semi-conductor 56 or conductor 63, contact studs 64 or 66, contact brush 48, strip 65 and distance-pieces 62 on the assembling rods.

The switch is shown in the general and more frequent form of a six-position device for a three-speed transmission, the positions being obtained by rotating the rotor 41 in the clockwise direction as seen in FIGURES 5 and 6, i.e. parking position P (consisting of an angular "rest," for in this position it is the mechanical control inside the transmission that provides the parking condition thereof), reverse position R, neutral position N, automatic position A in which the switch is inoperative, and gear changes being produced by transistors 55 and 56 alone, first or low-gear position and automatic second gear (or intermediate gear), called "intermediate," first imposed gear position 1, this last case being illustrated in FIGURE 6.

In positions N, R and P the electromagnet 53 is energized via contact stud 66.

The switch control constitutes an adjunct and is therefore quite reliable. Of course, the field of application of this device should not be construed as being limited to the control of a three-speed transmission with six lever positions.

Reverting to FIGURE 4, behind the printed-circuit plate 50 there is another printed circuit plate 57 having its copper side at 67. Therefore, the electronic devices register with each other at 68 and 69. The electrical connections between the strips of the copper faces 51 and 67 are provided by pins 77 extending through the printed circuit plates 50 and 57, and connecting wires 86.

Power semi-conductors such as 55 are housed in machined recesses 70 formed in a circular plate 71 made of highly conducting metal which receives in holes 72 provided to this end the rods 33 of the switch which are locked by nuts 73, whereby the assembly comprising the plate 71, the printed circuits and the detent-positioning device constitutes a compact unit connected to the case 6 only through the shouldered ring 29 and the companion nut 28. The end plate 71 and case 6 act as radiator means to the semi-conductors 55.

Screwed in the centre of en end plate 71 is a sleeve 74 for a packing box wherein the joint 75 secures the seal between the cable 13 and the plate 71. The conductors 76 of cable 13 are connected to the printed plate 57 by tubular distance-pieces 62, eyelets 80 are secured to means of the aforesaid pins 77 soldered at the same time as the electronic devices. The ground connections 62 are incorporated in the cable 13. The pin 78 of semi-conductor 55 extends through eyelets formed in tags 79 carried by plate 57.

To ensure a satisfactory and reliable electric contact between the copper strips of the printed circuits and the tubular distance-pieces 62, eyelets 80 are secured to plates 50 and 57, and welded or soldered to the copper circuit elements.

The general fluid-tightness of the case is provided for by rubber seals 81, 82, 83 and the cavities 85 receiving the nuts of rods 33 are sealed by using a suitable thermosetting resin containing 5% of aluminium powder.

For safety's sake, the case 6 is partially crimped at 84 on the periphery of the circular plate 71.

FIGURE 7 illustrates a modified form of embodiment of the arrangement shown in FIGURE 4, wherein the shaft 43 and rotor 41 constitute a same and integral member having a diametral slot 87, the outer peripheral portion thereof being of revolution as before (see FIGURE 8). The end 86 of control shaft 8 then consists of a male screwdriver or tenon.

FIGURE 9 illustrates in radial section the end of one of the comb teeth 49 engaging the printed circuit 50.

FIGURE 10 is a section taken along the line E—E of FIGURE 9, which illustrates the slightly bulged configuration of the tooth.

As a typical example of a practical embodiment of the control device of this invention, a control case 6 having a diameter of 80 mm. and an over-all length of 56 mm. (including the fastening plate) was used, the radius from the axis of shaft 43 to one of the fastening bolts 22 being also 56 mm., the thickness of circuit 50 being 3.2 mm. (⅛"). The semi-conductor 55 was a PNP-type transistor. Its case connected to the collector was mounted indirectly, without resorting to any insulating means whatsoever, on the plate 71.

Both members 34 and 41 consisted of a suitable moulded formaldehyde polymer or copolymer, the other insulating members consisting of superpolyamid.

Of course, various modifications may be brought to the specific form of embodiment illustrated, described or suggested herein without inasmuch departing from the spirit and scope of the invention as set forth in the appended claims.

I claim:
1. An electronic device for controlling automatic change-speed transmission of vehicles or machines, comprising a gearbox in a casing, electrical members for controlling speed-change of said gearbox, a gear lever, an electronic device having semi-conductors for selectively energizing said electrical members controlling the speed change of said gearbox, a governor operatively connected to transmit to said electronic device information relative to the vehicle speed and to the vehicle accelerator posi- tion, said information being converted by said device into speed-change orders, said electronic device comprising a printed-circuit rotative commutator in a common case, mechanical means to drive said commutator by said gear lever in a rotary motion to thereby modify the energization of said speed control change controlling members and so modify the automatic speed-change operation at the driver's will.

2. An electronic device according to claim 1, wherein said common case is of substantially cylindrical configuration, further comprising insulating washers to heat insulate said case from said gearbox casing.

3. An electronic device according to claim 1, further comprising a drive control shaft operatively connected at one end to said gear lever, a boss in said gearbox receiving said shaft, an asymmetric plate secured to said boss on the side thereof opposite said gear lever, and said common case being welded to said plate and receiving the other end of said shaft.

4. An electronic device according to claim 3, further comprising an insulating circular nut centering said common case on said boss independently of said drive control shaft, and a shouldered screw-threaded ring extending through said case and acting as a guide member of said commutator shaft, said nut engaging said ring.

5. An electronic device according to claim 4, wherein said commutator comprises a disk-shaped rotor having a plurality of adjacent triangular notches formed in its peripheral edge, a ring-shaped member having three bores spaced 120° apart, a ball engaged in each bore, a coil compression spring disposed in each said bore biasing said ball towards said notches, a traverse pin closing the outer end of each said bore, said rotor with said ring constituting a detent-positioning device controlling the commutator position, a shaft connecting said rotor to said drive control shaft, a base plate fixed to said shouldered screw threaded ring, a pair of resilient metal brushes each having the shape of a comb with teeth of unequal length, and a first printed circuit plate carrying metal strips on an inner half-track and an outer half-track.

6. An electronic device according to claim 5, wherein said teeth have a rounded end adapted to slidably engage said metal strips, the contact between the strips of said inner half-track of said printed circuit plate and those of the said outer half-track being established by the two innermost teeth of said combs and the two outermost teeth of said combs, tubular distance pieces and screw threaded rods being provided for mechanically positioning said printed circuit plate and for grounding the strips of said internal half-track to the case, and eyelets fixed to said outermost half-track to ensure a reliable electrical contact.

7. An electronic device according to claim 5 wherein said detent-positioning device has six positions corresponding to first, second and third gears, all automatic, neutral, reverse, and parking with mechanical locking of the transmission mechanism, said detent-positioning device being inoperative in the parking position along an angular zone corresponding substantially to the angular spacing of two adjacent positions, the end position being obtained in this case only by the transmission control shaft.

8. An electronic device according to claim 5 wherein said rotor and the shaft of said detent-positioning device are formed as a single integral member of a suitable formaldehyde polymer or copolymer.

9. An electronic device according to claim 5, further comprising a second printed circuit plate carrying a major portion of the electronic elements of said device and being in register with said first plate and having the copper faces thereof facing each other, said second plate having soldered thereto by means of pins output wires of output conductors forming a cable between a connecting box leading to said governor and said case, and also tag eyelets to which pins of said semi-conductors are connected.

10. An electronic device according to claim 9, further comprising a circular plate of conducting metal provided for closing and sealing the case end, a gasket on the outer periphery of said plate, a sleeve packing on said plate for sealing the joint between said cable leading to said connecting box and the case, and cavities formed in said plate for carrying said semi-conductors on the side opposite to said semi-conductor pins, said semi-conductors being in direct electrical and mechanical contact with said circular plate, said plate constituting with said external case radiator means for dissipating the heat generated by said semi-conductors.

11. An electronic device according to claim 9 further comprising screw-threaded rods connecting said circular conducting plate to said tubular distance pieces, said printed circuit plates and said ring-shaped member being disposed at the base of said detent-positioning device, said rods clamping said above-mentioned elements against one another by means of tightening nuts, the nuts being located in said circular conducting plate side and being housed in cavities sealed with thermosetting resin, one of said screw-threaded rods being longer than the others and serving as a means for angularly positioning the inner assembly in a cavity of said case.

References Cited

UNITED STATES PATENTS

| | | | |
|---|---|---|---|
| 2,536,462 | 1/1951 | Price | 74—336.5 X |
| 2,568,958 | 9/1951 | Hey et al. | 74—336.5 X |
| 2,637,425 | 5/1953 | Long et al. | 74—336.5 X |
| 2,911,848 | 11/1959 | Carnagua | 74—336.5 X |
| 2,922,311 | 1/1960 | Lucien et al. | 74—336.5 |
| 3,125,893 | 3/1964 | Bensinger | 74—336.5 X |

ARTHUR T. McKEON, Primary Examiner

U.S. Cl. X.R.

74—846, 866